July 30, 1940.   J. B. BRENNAN   2,209,871
ELECTROLYTIC DEVICE
Filed Dec. 3, 1937
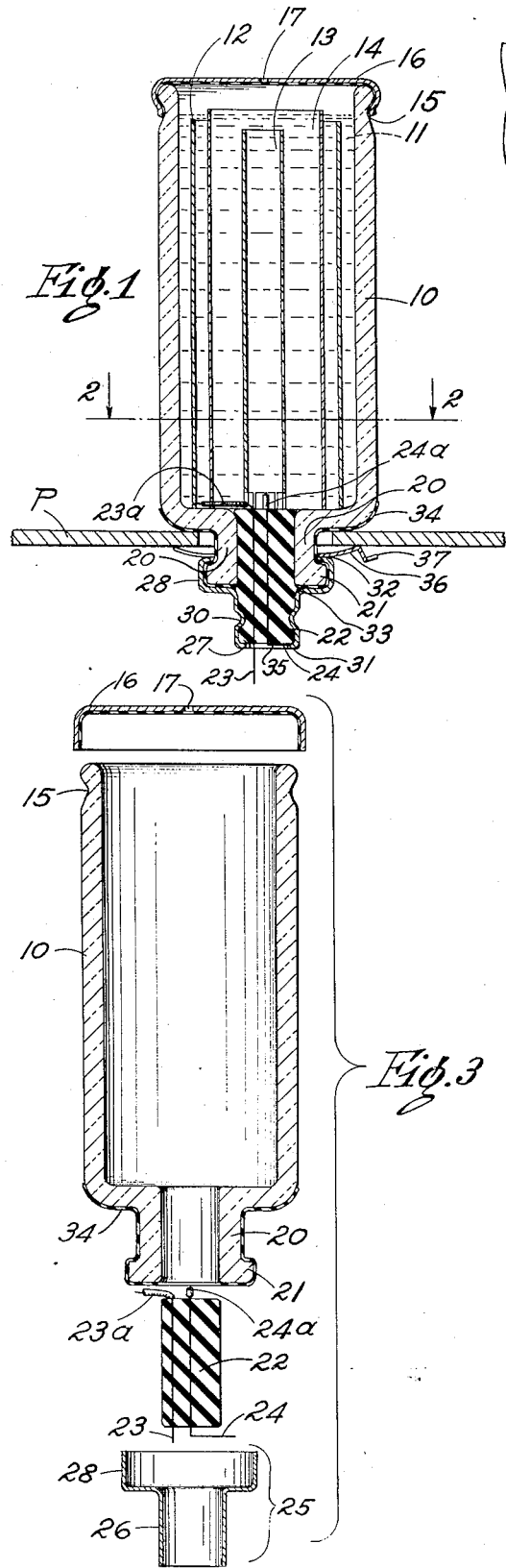
INVENTOR.
JOSEPH B. BRENNAN
BY
Rieley & Watts
ATTORNEYS Patented July 30, 1940

2,209,871

UNITED STATES PATENT OFFICE 2,209,871

ELECTROLYTIC DEVICE

Joseph B. Brennan, Euclid, Ohio

Application December 3, 1937, Serial No. 177,913

13 Claims. (Cl. 175—315)

This invention relates to electrolytic devices and more particularly to the containers for the electrolytes of such devices. The invention is described herein in its application to electrolytic condensers of the type embodying a liquid electrolyte and one or more electrodes having dielectric films electro-formed thereon.

In such condensers it is desirable to take one or more of the leads or terminals for the electrodes out through the bottom of the condensers. By such a construction the leads or terminals are completely submerged in the electrolyte and thus corrosion, which would otherwise take place at the surface of the electrolyte if the terminals were taken out of the top of the container, is eliminated.

It has been the practice heretofore to construct containers of metal, ordinarily aluminum, formed with a depending neck portion through which the anode terminal of the condenser extends. The depending neck portion has been crimped to compress a grommet surrounding the downwardly extending terminal to prevent leakage of the electrolyte at this point. This construction has been satisfactory but the metallic containers are expensive, are subject to corrosion, and further can not be reclaimed if it is found necessary to remove the anode from the condenser.

It is among the objects of my invention to provide an electrolytic device in which the above mentioned difficulties are obviated and which embodies a container for electrolyte preferably made of glass or other suitable inert insulating material. It is a further object of my invention to provide such a container for electrolyte having leak-proof means for sealing an opening in the bottom thereof through which the electrode terminals extend. Another object is to provide such an electrolytic device which can be conveniently mounted in an apertured plate and which is provided with convenient means for connecting the electrode terminals to an external electrical circuit. Further objects and advtantages of my invention will become apparent from the following description of preferred forms thereof. The essential characteristics are summarized in the claims.

Briefly a preferred form of my invention, as applied for example to electrolytic condensers, contemplates a molded container for electrolyte formed of glass and having a depending neck portion through which the electrode terminals extend. The electrode terminals preferably are wires which pass through a rubber grommet or plug which fits snugly within the depending neck portion and which has a portion extending beyond the neck portion. Surrounding this extended portion of the rubber plug or grommet, I preferably provide a metallic sleeve which is deformed inwardly to compress the rubber grommet to make a leak-proof joint between the grommet and the electrode terminal and which further functions to expand the rubber grommet in the region adjacent the end of the neck portion of the container and to retain it against longitudinal displacement, thus making a leak-proof joint between the container and the grommet. The metallic sleeve may also be employed to form a connection between one of the electrode terminals and an external circuit as will hereinafter appear.

Referring to the drawing, Figure 1 illustrates a longitudinal sectional view of a preferred form of my invention as applied to an electrolytic condenser and showing the condenser mounted in an apertured plate; Figure 2 is a sectional view thereof as indicated by the line 2—2 of Figure 1; Figure 3 is a view illustrating parts of the condenser shown in Figure 1, before assembly thereof; Figure 4 is a perspective on a reduced scale illustrating a mounting clip which may conveniently be employed with any condenser; Figure 5 is a fragmentary illustration of a condenser embodying a modified form of my invention; and, Figure 6 is a sectional view on an enlarged scale, as indicated by the line 6—6 of Figure 5.

As shown in the drawing, a condenser embodying my invention may comprise a container 10, preferably made of glass. The electrolyte 11 is disposed within the container and any suitable type of electrodes 12 and 13 may be immersed in the electrolyte. Preferably the electrodes 12 and 13 are formed by spraying molten film forming metal onto a porous sheet material such as woven glass fabric. This preferred type of electrode is disclosed and claimed in my copending application Serial No. 158,105, filed August 9, 1937. Preferably the outer electrode 12 is the anode of the condenser, while the inner electrode 13 forms the cathode. Depending upon the type of electrodes and electrode supports, it may be desirable to employ a spacer member 14 to prevent contact between the anode and cathode. The spacer 14 may be of any suitable perforated or porous insulating material such as the glass cloth spacer described in my copending application Serial No. 67,934, filed March 9, 1936.

The upper end of the container 10 is open as indicated and may be provided with an annular groove 15 which may be engaged by any suitable cap or cover member 16 having a vent 17 therein.

At the lower end of the container 10, a depending neck portion 20 is formed which is preferably of smaller diameter than the main portion of the condenser and is provided with a slightly enlarged flange 21. The opening in the depending neck portion may conveniently be closed by a rubber plug or grommet 22 having small openings therein through which the lead wires or terminals 23 and 24 for the anode and cathode, respectively, extend. To prevent the lead wires from being short circuited within the container, they may be suitably insulated as by short pieces of small rubber tubing 23a and 24a, respectively. The plug or grommet is preferably cylindrical so that it can be made economically by merely cutting a long rubber cylinder of the proper diameter to the proper length. The grommet fits snugly within the opening in the depending neck portion, and if desired the grommet or the inner surfaces of the opening may be coated with latex or rubber cement before the grommet is inserted in order to assist in making a leak-proof joint.

In electrolytic condensers embodying film maintaining electrolytes which ordinarily are solutions of borax and boric acid or other film maintaining salts, the problem of preventing leakage around the anode terminal or riser is a difficult one because of the tendency for a crystalline growth to take place progressively along the terminal. I have found that leakage and the progressive growth of the crystals along the terminals can be prevented if the ruber is subjected to a high degree of compression against the terminal or leads. To attain this high degree of compression and thus seal the terminals against leakage and at the same time seal and retain the grommet within the neck 20, I employ a metallic sleeve member 25. As will be seen from the drawing, the member 25 has a portion 26 of reduced diameter which extends downwardly along the projecting portion 27 of the grommet 22 and a portion 28 of enlarged diameter surrounding the flange 21. The sleeve after being positioned as described, is subjected to a spinning or crimping operation to deform the sleeve inwardly as at 30 to compress the rubber grommet severely and thus form a tight joint between the grommet and the lead-in wires 23 and 24, and preferably at the same time the lower end portion of the sleeve may be flanged inwardly as at 31 to prevent the material of the grommet from flowing axially downwardly while the upper end of the enlarged portion 28 may be flanged or crimped inwardly as at 32 to securely retain the sleeve in engagement with the flange 21. By these operations not only is a tight joint made between the lead-in wires and the grommet but also the sleeve is secured to the container so that the grommet can not come out of the container and the inward deformation at 30 causes the grommet to bulge outwardly as at 33 further to seal the grommet against the inner surfaces of the depending neck portion 20. Thus the sleeve when deformed as described above, completes the assembly and produces a strong and leak-proof closure for the depending neck portion of the condenser.

If desired the lower portion of the container, including the neck 20 may be dipped in liquid latex or rubber cement as shown at 34 before the sleeve is applied thereto or a gasket may be inserted between the sleeve and the neck portion to permit relative expansion and contraction of the container and the sleeve under the influence of changes in temperatures. Preferably the anode terminal is extended downwardly and the connection to an external circuit is made directly with the wire 23. To adapt the condenser for mounting in an apertured plate in accordance with the practice employed in connection with metal containers, however, the cathode terminal may be bent as indicated at 35 so that it will be engaged by the portion 31 of the sleeve 25. The completed condenser may be mounted in an apertured plate P, as illustrated, by means of a resilient clip 36 (see Figures 1 and 4) which engages the plate and the flanged portion 31 of the sleeve. Thus the electrical circuit is completed to the plate P or, if desired, the connection to the external circuit can be made through a small terminal 37 formed on the clip 36.

In Figures 5 and 6 I have illustrated a modification of my invention wherein the glass container 40 is provided with a threaded neck 41. The threads are adapted to receive a mounting nut 43 which securely clamps the condenser in the apertured plate P'. If desired a rubber washer 44 may be interposed between the container 40 and the upper surface of the plate. The nut 43 may be formed of any suitable material, for example a metal such as aluminum, or a plastic such as Bakelite.

The depending neck portion is flanged as at 45 in the manner previously described, and as previously described a rubber grommet 46 extends through the neck portion and carries the usual lead-in wires. The grommet is compressed and retained in position by a metallic sleeve 49, which is generally similar to the sleeve 25 heretofore described, but in this instance I have shown the sleeve as being crimped inwardly along lines extending axially of the sleeve as at 50. Obviously the sleeve could be deformed inwardly in an annular groove as previously described. The sleeve is secured to the flanged portion 45 by crimping inwardly as at 51. The crimping functions to compress the grommet against the wires or terminals 47 and 48 and also tends to expand the rubber in the zones on either side of zone of compression, thus causing the grommet to expand into tight engagement with the neck in the region indicated at 52.

In this modification the condenser is insulated from the supporting plate so that both lead-in wires 47 and 48 are extended through the grommet and their ends are left free for connection with an external circuit. The electrodes and electrolyte may be disposed within the container as previously described, and the upper portion of the container may be provided with a suitable closure or vent.

From the foregoing description of preferred forms of my invention, it will be seen that I have provided a container for electrolytic devices which can be manufactured economically and that condensers embodying my invention can be rapidly and economically assembled. In carrying out the assembly operations, it is only necessary to thread the lead-in wires through the rubber grommet, connect them to the electrodes and insert the grommet through the depending neck portion of the condenser. Thereafter the metallic sleeve may be slipped over the end of the grommet and deformed to compress the grommet and also to secure the sleeve to the neck of the condenser. The upper portion of the condenser may then be provided with a suitable closure.

Condensers made according to my invention are particularly advantageous in that there is no possibility of contamination of the electrolyte by reason of corrosion of the container. Furthermore my containers are leak-proof and may be conveniently mounted in an apertured plate. A further advantage of my containers is found in the fact that the electrodes can be removed therefrom without destroying the entire container, it only being necessary to destroy the sleeve which functions to clamp the rubber grommet in position. This feature alone is of importance for in the manuafcture of electrolytic condensers, a considerable percentage of condensers fail on test and must be rebuilt. With the metal containers heretofore employed, the containers of all such defective condensers had to be scrapped, whereas with my container there is no such loss.

Various modifications and changes in my invention will be evident to those skilled in the art. It is therefore to be understood that the foregoing description of preferred forms of my invention are only given by way of example, that my invention may be applied to other devices without departing from the spirit and scope thereof, and that my patent is not limited by the foregoing specification or in any manner other than by the scope of the appended claims.

I claim:

1. In an electrolytic device, a rigid non-metallic container for electrolyte having a depending neck portion having an opening therethrough, an electrical conductor extending through said opening, a grommet of resilient insulating material surrounding said conductor and disposed within said neck portion and having an end portion projecting beyond said neck portion, and a metallic sleeve secured to said neck portion and deformed into engagement with the projecting end portion of said grommet, whereby said grommet is sealed against said conductor and retained in position within the neck portion of the container.

2. In an electrolytic device, a non-metallic container for electrolyte having a depending neck portion having an opening therethrough, an electrical conductor extending through said opening, a grommet of resilient insulating material surrounding said conductor and disposed within said neck portion and having an end portion projecting beyond said neck portion, and a metallic sleeve disposed adjacent said neck portion and deformed into engagement with the projecting end portion of said grommet, thereby compressing said grommet against said conductor.

3. In an electrolytic device, a non-metallic container for electrolyte having an opening in the base thereof, an electrical conductor extending through said opening, a grommet of resilient insulating material surrounding said conductor and disposed within said opening and having an end portion projecting beyond said opening, and a metallic sleeve secured to said container and deformed into engagement with the projecting end portion of said grommet, whereby said grommet is sealed against said conductor and retained in position within the neck portion of the container.

4. In an electrolytic device, a glass container for electrolyte having a depending neck portion, and a passageway therethrough, an electrical conductor extending through said passageway, a rubber grommet surrounding said conductor and disposed within said neck portion and having an end portion projecting beyond said neck portion, a metallic sleeve secured to said neck portion and deformed into engagement with the projecting end portion of said rubber grommet, whereby said rubber grommet is sealed against said conductor and retained in position within the neck portion of the container, and means associated with said neck portion for mounting said device in an apertured plate.

5. In an electrolytic device, a container for electrolyte having a depending neck portion of rigid material, and a passageway therethrough, an electrical conductor extending through said passageway, a rubber grommet surrounding said conductor and disposed within said neck portion in sealing engagement therewith and having an end portion projecting beyond said neck portion, and a separately formed deformable metallic sleeve secured to said portion and deformed into engagement with the projecting end portion of said rubber grommet, whereby said rubber grommet is sealed against said conductor and retained in position within the neck portion of the container.

6. In an electrolytic condenser, a container formed of insulating material and having an opening at the bottom thereof, an electrolyte and an electrode within said container, an electrical conductor for said electrode extending through said opening, a resilient sealing member surrounding said conductor, and a metallic sleeve secured to the lower portion of said container and having a portion thereof deformed into engagement with said sealing member to compress said sealing member against said conductor.

7. In an electrolytic condenser, a container formed of insulating material and having an opening at the bottom thereof, an electrolyte and an electrode within said container, an electrical conductor for said electrode extending through said opening, a resilient sealing member surrounding said conductor, a flanged metallic sleeve secured to the lower portion of said container and in electrical contact with said conductor and having a portion thereof deformed into engagement with said sealing member to compress said sealing member against said conductor, and means engageable with said flanged metallic sleeve for securing said condenser to a support.

8. In an electrolytic condenser, a container formed of insulating material and having an opening at the bottom thereof, an electrolyte and a plurality of electrodes within said container, electrical conductors for said electrodes extending through said opening, a resilient sealing member surrounding said conductor, and a flanged metallic sleeve secured to the lower portion of said container and making electrical contact with one of said conductors and having a portion thereof deformed into engagement with said sealing member to compress said sealing member against said conductors, and means engageable with said flanged metallic sleeve for securing said condenser to a support.

9. An electrolytic device comprising a glass container for electrolyte having an opening in the base thereof, an electrolyte within the container, an electrode immersed in the electrolyte, a terminal for the electrode extending downwardly through said opening and to the exterior of said container, sealing means of resilient material disposed within and projecting beyond said opening for preventing leakage of electrolyte through said opening and around said terminal, and means disposed externally of said container and engaging the projecting portion of said resilient material for compressing said material against said terminal and retaining said material in position within said opening.

10. An electrolytic device comprising a container for electrolyte formed of rigid insulating material, and having a downwardly extending neck portion provided with a passageway therethrough, an electrolyte within the container, an electrode immersed in the electrolyte, a terminal for the electrode extending downwardly through said passageway and to the exterior of said container, resilient sealing material disposed within and projecting beyond said neck portion for preventing leakage of electrolyte through said passageway and around said terminal, and means disposed externally of said neck portion and engaging the projecting portion of said sealing material for compressing said sealing material against said terminal and retaining said material in position within said passageway.

11. An electrolytic device comprising a container for electrolyte formed of rigid insulating material, and having a downwardly extending neck portion provided with a passageway therethrough, an electrolyte within the container, an electrode immersed in the electrolyte, a terminal for the electrode extending downwardly through said passageway and to the exterior of said container, resilient sealing material disposed within said passageway for preventing leaking of electrolyte through said passageway and around said terminal, and means disposed externally of said neck portion and engaging the outer surface thereof for compressing said sealing material and retaining said material in position within said passageway.

12. In an electrolytic condenser having a container of insulating material having an opening at the bottom thereof, an electrolyte and an electrode within said container, and a resilient sealing member surrounding said conductor; the combination of a flanged metallic sleeve secured to the lower portion of said container and having a portion thereof deformed into engagement with said sealing member to compress said sealing member against said conductor, and a resilient clip engageable with said flanged metallic sleeve for securing said condenser to a support.

13. In an electrolytic device having a container for electrolyte formed of rigid insulating material having a depending neck portion terminating in an outwardly extending flange, said neck portion having a passageway therethrough, an electrical conductor extending through said passageway, and a rubber grommet surrounding said conductor and disposed within said neck portion and having an end portion projecting beyond said neck portion; the combination of a metallic sleeve secured to the flange of said neck portion and deformed into engagement with the projecting end portion of the rubber grommet whereby said rubber grommet is sealed against said conductor and retained in position in the neck portion of the container, and means engaging the flange of said neck portion for securing said device in an apertured plate.

JOSEPH B. BRENNAN.